Dec. 6, 1966 C. B. COHEN ETAL 3,289,974
MANNED SPACECRAFT WITH STAGED RE-ENTRY
Filed Jan. 2, 1964  2 Sheets-Sheet 1

INVENTORS.
CLARENCE B. COHEN
JULIUS D. SCHETZER
JOHN R. SELLARS
By E. Hayward Marshall
AGENT Dec. 6, 1966  C. B. COHEN ETAL  3,289,974

MANNED SPACECRAFT WITH STAGED RE-ENTRY

Filed Jan. 2, 1964  2 Sheets-Sheet 2

INVENTORS.
CLARENCE B. COHEN
JULIUS D. SCHETZER
JOHN R. SELLARS

By E. Hayward Marshall
AGENT

United States Patent Office 3,289,974
Patented Dec. 6, 1966

3,289,974
MANNED SPACECRAFT WITH STAGED RE-ENTRY
Clarence B. Cohen, Redondo Beach, Julius D. Schetzer, Palos Verdes Estates, and John R. Sellars, Redondo Beach, Calif., assignors to TRW Inc., a corporation of Ohio
Filed Jan. 2, 1964, Ser. No. 335,333
7 Claims. (Cl. 244—1)

This invention relates to a space vehicle and more particularly to a manned orbital spacecraft comprising a blunt, lifting re-entry vehicle with its upper surface formed largely by a subsonic delta wing aircraft which provides for the introduction of a staging operation between re-entry and landing.

Manned re-entry vehicles consisting of a blunt body such as the "Mercury" capsule provide for efficient re-entry into the earth's atmosphere, but are limited substantially to a ballistic trajectory which is determined by the precise time of firing of the retro-rockets, and after re-entry, little or no control is possible over the exact landing site. To achieve some measure of maneuverability during re-entry with a "capsule," designs have been generated such as the "Gemini" or "Apollo" vehicles which utilize an off-set position of the center of gravity combined with a roll control in order to beneficially change the entry trajectory. These designs, however, require the use of parachutes and/or parawings for their terminal glide descent and provide limited maneuverability and landing flexibility. A lifting body configuration, such as the NASA M-2 design, provides adequate maneuverability and heat protection during re-entry, but does not have the low speed flying qualities and versatile landing characteristics desirable for manned operations. To increase the landing capability other types of manned re-entry vehicles such as the "DynaSoar" design have been devised. These are basically modified winged high speed gliders which are difficult to protect from entry heating and consequently are relatively heavy and provide only a limited flexibility in the landing operation. Conventional high speed or supersonic aircraft cannot withstand the re-entry heating and loading during the initial phases of re-entry into the earth's atmosphere.

The space vehicle of the present invention introduces the novel concept of a staging operation between re-entry and landing. This sequence obviates the usual conflict between the requirements of efficient re-entry and good landing characteristics. It also provides a special ability for the crew to select alternative landing sites even in the event of an aborted launch. Therefore, routine launch and return can be accomplished relatively independent of weather conditions or large recovery task forces, and also provides an improved operational capability.

Briefly stated, one preferred embodiment of the manned spacecraft of the present invention consists of a blunt, lifting, re-entry vehicle with its upper surface formed largely by a subsonic delta wing aircraft. The blunt lifting body or pod may furnish the necessary volume in the spacecraft for orbital operations in space and in this case also serves as the re-entry heat shield, or may be only a jettisonable heat shield. The lifting body further provides a substantial aerodynamic maneuver capability during re-entry. After the re-entry heating and loading period, the aircraft is separated from the pod and proceeds to a preselected landing site, being piloted by the crew in the normal manner of a conventional aircraft with sufficient fuel to fly to any selected or desired airport within a relatively large area. In an aborted mission, the airplane separation option permits the crew to fly to safe landing sites sometimes adjacent to the launch area. This capability obviates the need for a large recovery task force attendant on every launch, and thereby lowers the cost of the launching.

One object of the present invention is to provide a manned space vehicle with staged re-entry which combines the advantages of efficient re-entry of a blunt lifting re-entry vehicle with the good landing characteristics of a conventional subsonic type of aircraft, as well as special capabilities to recover from an aborted launch.

Other objects and many of the attendant advantages of this invention will be readily appreciated as the same becomes better understood by reference to the following detailed description when considered in connection with the accompanying drawings wherein.

Figure 1:
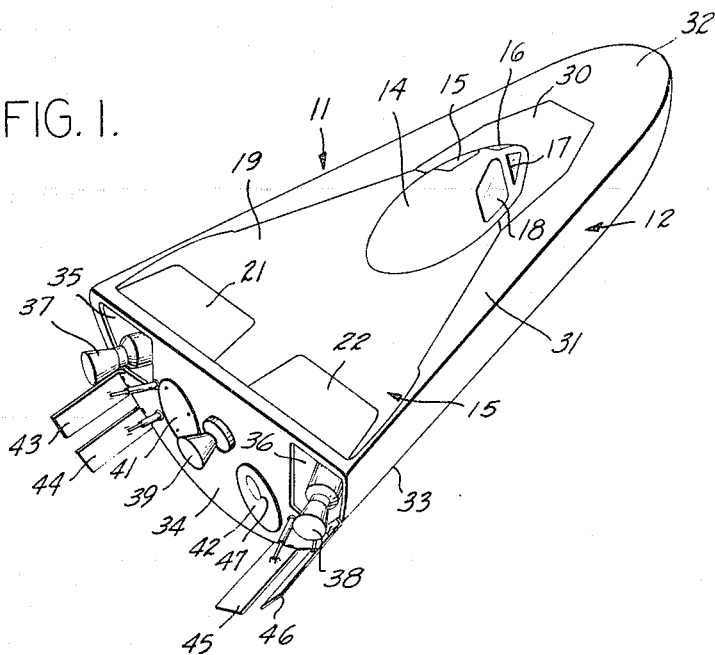
FIGURE 1 is a pictorial view illustrating one preferred embodiment of the manned re-entry space vehicle of the present invention after separation from the launch vehicle.
Figure 3:
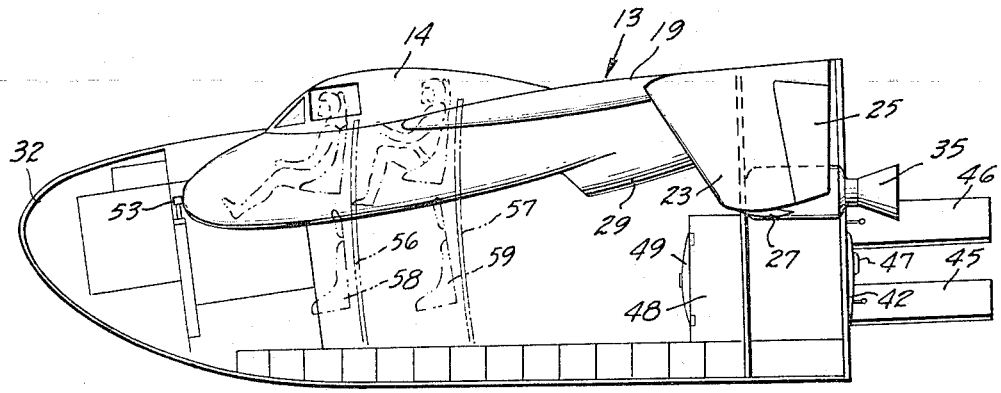
Figure 4:
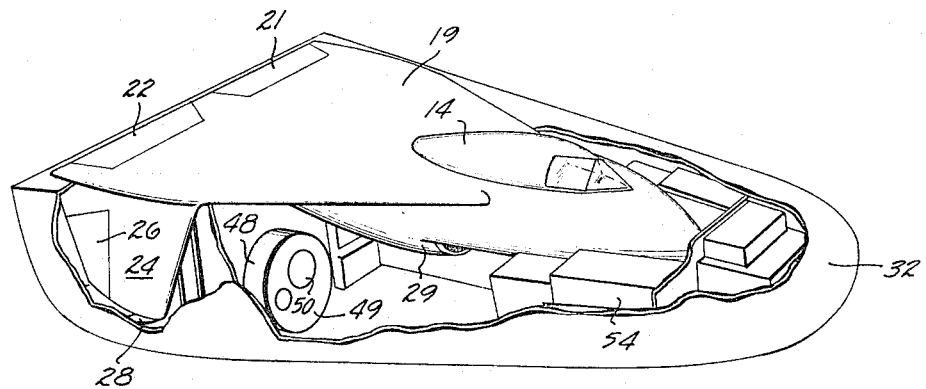

FIGURE 3 is a longitudinal sectional view taken through the manned space vehicle of FIGURE 1 and particularly illustrating the manner in which the crew are transferred in their seats from the pod into the aircraft prior to separation of the aircraft and pod; and FIGURE 4 is a pictorial view with portions broken away to illustrate the interior arrangement of the pod with the aircraft nested into its upper surface.

Referring now to the drawings in detail, and more particularly to the pictorial view of FIGURE 1, a manned spacecraft 11 is illustrated consisting of a blunt lifting body or pod 12 with a subsonic delta wing aircraft 13 nested into its upper surface as shown.

The aircraft 13 is provided with a canopy 14 having windows 15, 16, 17 and 18 which may be utilized during orbital operations for observation and during the landing of the aircraft on the earth's surface by the pilot in the conventional manner.

Figure 2:
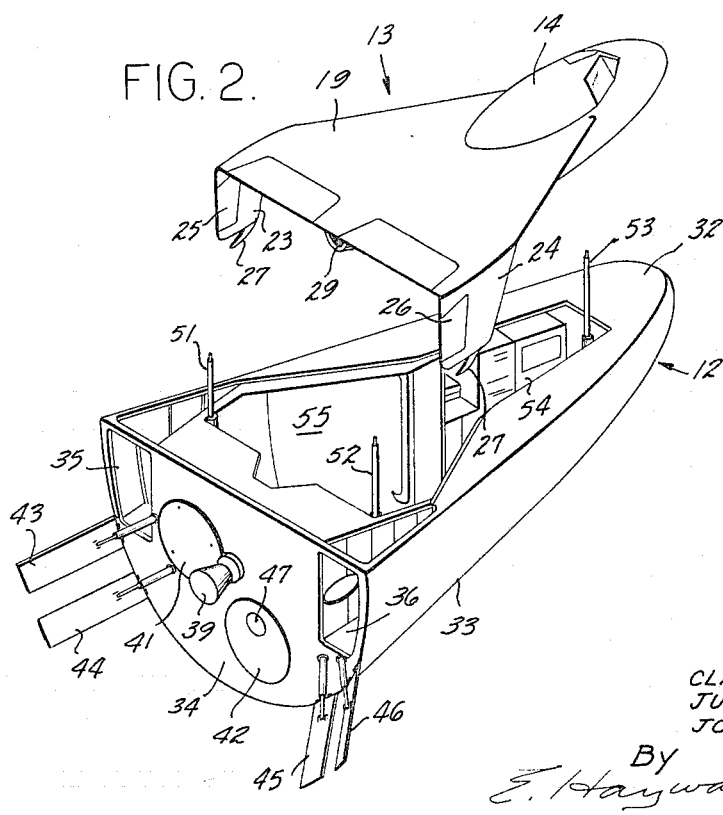
FIGURE 2 is a pictorial view of the spacecraft of FIGURE 1 with the aircraft being separated from the pod after the initial phase of the re-entry into the earth's atmosphere.

The aircraft 13 also includes a large delta wing 19 with horizontal control surfaces 21 and 22. As shown in FIGURE 2, the aircraft 13 also includes the downwardly extending vertical stabilizers 23 and 24 with the vertical control surfaces 25 and 26 as well as the tail skids 27 and 28. The aircraft is also provided with a conventional jet engine 29 mounted beneath its fuselage and wing 19.

The lifting body or pod 12 is provided with a relatively flat upper surface 31 which is substantially flush with upper surface of the aircraft wing 19 and tapers forward into the rounded blunt nose 32. The lower surface 33 of the pod 12 is substantially frusto-conical in shape and is rounded or faired into the blunt nose 32 as shown.

The after bulkhead 34 of the pod 12 is substantially semicircular in shape and is provided with two compartments 35 and 36 which house the two abort rockets 37 and 38. A retro-rocket 39 is centrally located in the after bulkhead 34 which also has a circular plate 41 covering a compartment enclosing a landing package, including one or more parachutes for safely landing the pod 12 with all of its instrumentation, electronic gear and other equipment. The hatch 42 provides access to the pod from the launch vehicle through an airlock 48 having an inside hatch 49. The airlock 48 may also be utilized during orbital flight for entrance to and exit from the space vehicle 11. The hatches 42 and 49 may have observation ports 47 and 50, if desired.

The edges of the after bulkhead 34 may also be provided with movable control flaps 43, 44, 45 and 46 which have actuators to provide a substantial aerodynamic maneuver capability for the space vehicle 11 during the initial stages of re-entry into the earth's atmosphere.

A small panel 30 covers the forward end of the aircraft 13 and is faired into the upper surface of the pod 12 being flush therewith.

As shown in FIGURES 2 and 3, the pod 12 is preferably provided with telescoping rods 51, 52 and 53 or other suitable means for ejecting the aircraft 13 after the first phase of re-entry is completed. These may be actuated by means of ordnance, or electrically, hydraulically, or mechanically as desired. It should also be noted in FIGURE 2 that the downwardly extending vertical stabilizers 23 and 24 on the aircraft 13 nest or fit down into the compartments 35 and 36 which also house the abort rockets 37 and 38.

The pod 12 may also house any suitable electronic and life support equipment, such as that shown at 54 in FIGURE 2 forward of the bulkhead 55. However, if used only as a jettisonable heat shield, the inside of the pod may be empty and could be considerably smaller in size.

In the longitudinal sectional view of FIGURE 3, the aircraft 13 is shown in side elevation while the pod is shown in section to illustrate the arrangement of the interior of the pod.

Of particular interest in FIGURE 3, are the curved tracks 56 and 57 which support the seats 58 and 59 which are used to support the crew members in a suitable position within the pod during launch and are subsequently raised to the position shown within the aircraft for the re-entry prior to separation of the aircraft 13 from the pod 12.

The staging concept makes this spacecraft a variable geometry vehicle that circumvents the difficult design compromises which otherwise must be made to ensure good re-entry characteristics, high volumetric efficiency, and safe, precise landing capability. The two principal parts of the spacecraft 11 are: (1) a bluff lifting re-entry body or pod 12 which can be approximated by a blunted half-cone; and (2) a low-speed wing turbo-jet airplane 13 whose upper wing surface 19 is also the upper, almost flat surface of the spacecraft 11. The pod 12 provides space for the orbital operations of the crew, for the supporting subsystems, and encloses the airplane fuselage and vertical tail surfaces. There is free access between the two vehicles at all times.

At re-entry the vehicle is a high-volume, lifting body with blunt edges. Controllable trim is obtained through the use of the trailing body flaps 43, 44, 45 and 46. During the re-entry, the nominal lift-drag ratio is achieved by flap deflection. However, even without flap deflection, the spacecraft develops a positive pitching moment which will cause it to trim at its maximum lift-drag ratio. This performance combination, provides re-entry range variation both downrange and uprange. By applying roll, a side range capability is obtainable.

At the discretion of the pilot, and at any altitude below about 50,000 feet, the aircraft 13 is separated from the pod 12, which descends by parachute. The crew observes this descent from the airplane, confirms the pod recovery site, and proceeds to its preselected landing site. Because the landing speed is low, and because of the airplane's relatively small size, it can land at any airport.

The normal operational sequence includes four phases: launch, orbit, descent, and landing.

*Launch*

The crew enters the spacecraft cabin through the interstage structure, via a hatch 42 and an airlock 48. During the pre-launch period, and during launch, the crew is seated within the pod on aircraft seats 58 and 59, which for launch are lowered into the pod on tracks 56 and 57. The tracks are curved so that when the seats are in the pod the crew is in proper position to undergo launch inertial loads, and, if necessary, abort loads. In the event of a mission abort, the seats are automatically retracted into the airplane cockpit following abort rocket burnout. This operation also seals the aircraft and positions the crew to exercise the option of aircraft separation without delay.

During normal launch the crew remains seated in the pod until final orbital injection. The controls and displays which the crew uses throughout this period are located on a console within the pod.

After second stage ignition, two of the three abort rockets can be jettisoned. This sequence saves the equivalent of 90% of their weight for orbital payload. Alternate modes of operation, would retain these rockets and use them for final orbital injection or for orbital maneuvers.

*Orbit*

The spacecraft is designed so that a variety of operations in orbit may be readily accomplished. There is sufficient clearance in the pod beneath the wings and ample volume for crew movement and payload equipment. The airplane canopy serves as a port for observing any functions performed outside of the spacecraft. A second port can be made integral with the airlock 48 at the rear of the pod to allow additional visual monitoring. Convenient access between the airplane and the pod is afforded by lowering or raising each seat. The seats and tracks can withstand the g-loads under nominal and abort flight conditions.

*Descent*

The descent operation is initiated normally by crew command. The first step is to orient the spacecraft for retro-thrust to fire the remaining abort or retro-rocket 39.

This orientation and the precise firing time may be selected by use of a display which continually presents potential landing areas for selected retro-impulse attitudes. The attitude may be established by low level reaction jets and maintained during retro firing by use of high level jets when required.

After the de-boost impulse, the vehicle falls for a short time in its descent to the atmosphere. During this period, the on-board computer calculates the required lift-drag ratio to bring the vehicle to the selected landing site, taking into account effects of variations in actual received de-boost impulse. Then the pod is re-oriented and the flaps are positioned to produce the required trimmed lift-drag ratio.

The nominal re-entry trajectory starts with a shallow entry angle to minimize the weight of the retro-rocket. Because lift is used, the vehicle is kept at high altitudes, thus "stretching out" the deceleration pattern. This reduces peak g's from 8 g's without lift to less than 2 g's. Lift also permits a lateral and ranging maneuver capability and, therefore, creates a broad area or "footprint" of available landing sites for a given re-entry condition.

During re-entry, the attitude control system may use a dual command mode of operation. In this mode the pod flaps, commanded by the attitude error signals, determine the spacecraft trim angle, while a high level gas jet system, commanded by the rate gyros, provides damping about that angle. This design will produce greater control precision and reliability at less weight than a single-command system. Approximately 12 minutes after re-entry, the principal heating and loads have diminished and the vehicle is passing through the 50,000 foot altitude level at a subsonic speed and a moderate dynamic pressure. From this point on, the dynamic pressure remains nearly constant down to low altitudes, and the pilot may command separation at his discretion. Following separation, the pod descends by parachute and the crew flies to its preselected landing site.

*Landing*

A lifting re-entry vehicle which must glide to a landing requires a special landing site, and these represent essentially very small targets. Since bad weather is most frequently encountered at low altitudes, when the maneuverability time is very short, small navigation errors during entry and descent cannot be easily corrected. In the design of the present invention, the aircraft operates as a vernier system to eliminate problems caused by these errors. Thus, it not only allows flexibilty and ease of landing, but it also extends the landing footprint and provides for precise selection of landing sites. Thus navigational errors can be corrected and the effects of bad weather made negligible. Also, reliable recovery of the crew is assured and costs are reduced by eliminating the need for special landing sites.

The actual separation of the aircraft from the pod will take place when conditions (Mach number, altitude, trajectory path) are best for aircraft flight. The pilot's role is to make the separation decision and to fly the airplane after separation. If separation is not commanded for any reason, the parachute system, deployed by command or automatically, will lower the entire spacecraft with airplane included to touchdown with a low vertical velocity, typical of parachute descents. If separation is commanded, the parachutes are automatically deployed after the airplane is ejected. At medium altitudes, and below, the airplane engine may be started by ram air or internal starter; a supplementary system provides air start capabilities up to about 45,000 feet. Depending upon the location of the preselected landing site and the separation altitude, the airplane can either descend immediately or can climb to its cruising altitude and fly to the landing site at maximum range cruise speeds. The aircraft handles and lands as a conventional subsonic airplane.

Obviously, many other modifications and variations of the present invention may be made within the scope of the following claims.

The embodiments of the invention in which an exclusive property or privilege is claimed are defined as follows:

1. A spacecraft with staged re-entry comprising:
A. a bluff re-entry body;
B. a fixed wing airplane including means for self propulsion the body of which is substantially nested within said bluff body; and
C. means for separating said body and said airplane.

2. A spacecraft with staged re-entry comprising:
A. a bluff re-entry body having one substantially flat surface with an opening therein;
B. a fixed wing subsonic airplane including means for self propulsion nested in said body with said wing being substantially flush with said flat surface; and
C. means for separating said body and said airplane.

3. A spacecraft with staged re-entry comprising:
A. a bluff lifting re-entry body having a shape approximated by a blunted half-cone with a rounded nose portion;
B. a fixed wing airplane nested in the upper portion of said body, said fixed wing forming a substantial portion of the upper surface of the spacecraft; and
C. means for separating said body and airplane.

4. A spacecraft with staged re-entry comprising:
A. a bluff lifting re-entry body having a shape approximated by a blunted half-cone with a rounded nose portion and an after bulkhead,
a plurality of control flaps extending from the peripheral edges of said after bulkhead;
B. an airplane nested in the upper portion of said body and having a wing substantially flush with the upper surface of the spacecraft,
said airplane having downwardly extending vertical stabilizers; and
C. means for separating said body and airplane.

5. A spacecraft with staged re-entry comprising:
A. a bluff lifting re-entry body having a shape approximated by a blunted half-cone with a rounded nose portion and a semi-circular after bulkhead,
a plurality of control flaps extending from the peripheral edges of said after bulkhead,
a plurality of rockets extending rearwardly from said body and having their axes aligned through the spacecraft center of gravity,
said body having an opening in its upper substantially flat surface;
B. a delta wing airplane nested in the upper portion of said body and sealed in said opening with said wing forming a substantial portion of the upper surface of the spacecraft,
said airplane having downwardly extending vertical stabilizers; and
C. means for separating said body and airplane.

6. A spacecraft with staged re-entry comprising:
A. a bluff lifting re-entry body having a shape approximated by a blunted half-cone with a rounded nose portion and a semi-circular after bulkhead,
a plurality of control flaps extending from the peripheral edges of said after bulkhead,
a plurality of rockets extending rearwardly from said body and having their axes aligned through the spacecraft center of gravity,
an airlock extending through said after bulkhead,
a recovery package extending through said after bulkhead,
said body having an opening in its upper substantially flat surface;
B. a delta wing airplane nested in the upper portion of said body and sealed in said opening with said wing forming a substantial portion of the upper surface of the spacecraft,
said airplane having downwardly extending vertical stablizers,
a canopy on said airplane which also serves as an observation port for said spacecraft; and
C. means for separating said body and airplane.

7. A spacecraft with staged re-entry comprising:
A. a bluff lifting re-entry body having a shape approximated by a blunted half-cone with a rounded nose portion and a semi-circular after bulkhead,
a plurality of control flaps extending from the peripheral edges of said after bulkhead,
a plurality of rockets extending rearwardly from said body and having their axes aligned through the spacecraft center of gravity,
an airlock extending through said after bulkhead,
a recovery package extending through said after bulkhead,
said body having an opening in its upper substantially flat surface;
B. a delta wing low speed airplane nested in the upper portion of said body and sealed in said opening with said wing forming a substantial portion of the upper surface of the spacecraft,
said airplane having downwardly extending vertical stabilizers,
a canopy on said airplane which also serves as an observation port for said spacecraft;
C. means for separating said body and airplane; and
D. a plurality of curved tracks between said body and said airplane,
a plurality of seats mounted on said tracks for movement between said body and said airplane.

(References on following page)

References Cited by the Examiner

UNITED STATES PATENTS

| | | | |
|---|---|---|---|
| 2,763,447 | 9/1956 | Carrau | 244—2 |
| 2,941,764 | 6/1960 | Lee et al. | 244—2 |
| 2,977,080 | 3/1961 | Zborowski | 244—2 |
| 2,998,208 | 8/1961 | Perna | 244—2 |
| 3,058,691 | 10/1962 | Eggers et al. | 244—2 |
| 3,090,580 | 5/1963 | Kehlet et al. | 244—1 |
| 3,132,825 | 5/1964 | Postle et al. | 244—1 |
| 3,147,936 | 9/1964 | Mercille | 244—2 |

FOREIGN PATENTS

| | | |
|---|---|---|
| 899,043 | 6/1962 | Great Britain. |

OTHER REFERENCES

Flight International, "F 111 Escape System," October 3, 1963, page 591.

Time magazine, "A Way Out," November 1, 1948, page 70.

Astronautics, pages 50–56, January 1963.

MILTON BUCHLER, *Primary Examiner.*

FERGUS S. MIDDLETON, ALFRED E. CORROGAN, *Examiners.*

R. G. BESHA, *Assistant Examiner.*